United States Patent
Ueda et al.

(10) Patent No.: US 8,415,062 B2
(45) Date of Patent: Apr. 9, 2013

(54) FUEL CELL SYSTEM AND METHOD OF STARTING FUEL CELL SYSTEM

(75) Inventors: Kenichiro Ueda, Wako (JP); Junji Uehara, Wako (JP); Yuji Matsumoto, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 670 days.

(21) Appl. No.: 12/636,228

(22) Filed: Dec. 11, 2009

(65) Prior Publication Data

US 2010/0151290 A1    Jun. 17, 2010

(30) Foreign Application Priority Data

Dec. 17, 2008   (JP) .................... 2008-320771

(51) Int. Cl.
*H01M 8/04* (2006.01)
*H01M 8/24* (2006.01)
*H01M 8/10* (2006.01)

(52) U.S. Cl.
USPC ........... 429/429; 429/459; 429/458; 429/456; 429/492; 429/491

(58) Field of Classification Search .............. 429/429, 429/459, 458, 456, 492, 491
See application file for complete search history.

(56) References Cited

U.S. PATENT DOCUMENTS

| | | | |
|---|---|---|---|
| 6,984,464 B2 * | 1/2006 | Margiott et al. | ............... 429/429 |
| 2002/0136942 A1 | 9/2002 | Kashiwagi | |

FOREIGN PATENT DOCUMENTS

| | | |
|---|---|---|
| EP | 1703579 A1 | 9/2006 |
| JP | 2005-093115 A | 4/2005 |
| JP | 2007-194157 A | 8/2007 |
| JP | 2007-317363 A | 12/2007 |
| JP | 2008-140772 A | 6/2008 |
| JP | 2008-257984 A | 10/2008 |
| WO | 2006-040999 A1 | 4/2006 |

OTHER PUBLICATIONS

European Search Report dated Mar. 19, 2010, issued in corresponding European Patent Application No. 09179112.9.
Japanese Office Action dated May 17, 2011, issued in corresponding Japanese Patent Application No. 2008-320771.

* cited by examiner

*Primary Examiner* — Helen O Conley
(74) *Attorney, Agent, or Firm* — Westerman, Hattori, Daniels & Adrian, LLP

(57) ABSTRACT

A fuel cell system includes a fuel cell, a cathode supply passage, a cathode discharging passage, an anode supply passage, an anode discharging passage, a pair of cathode shutoff units, an anode shutoff unit, an anode discharging unit, a discharged gas processing unit, and a control unit. The control unit releases the sealing of the cathode passage by the pair of cathode shutoff units, at the time of start-up of the fuel cell system, and releases the sealing of the anode passage by the anode discharging unit, thereby performing a purge process to allow discharge of the anode gas.

9 Claims, 4 Drawing Sheets

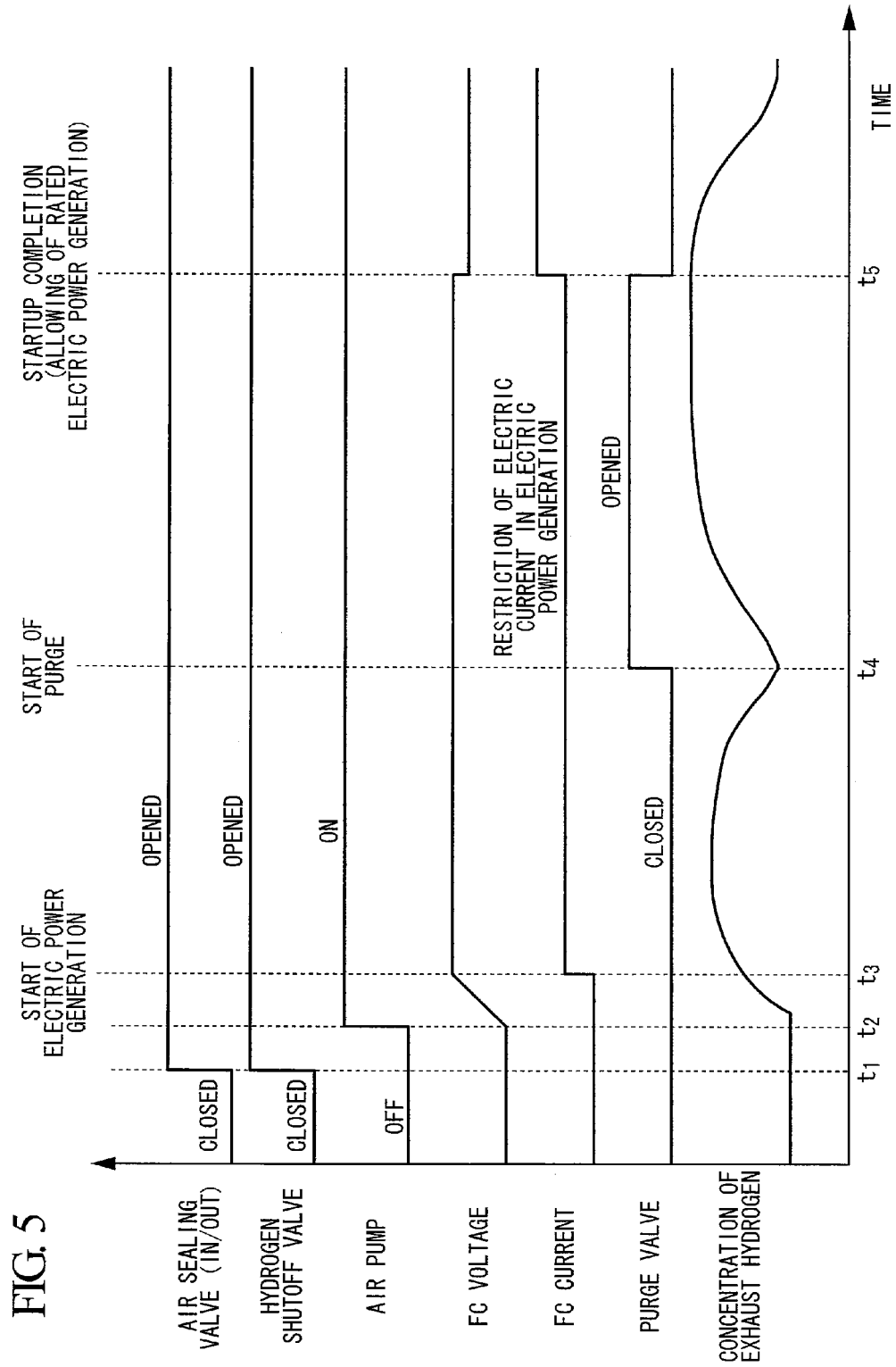

FUEL CELL SYSTEM AND METHOD OF STARTING FUEL CELL SYSTEM

BACKGROUND OF THE INVENTION

Priority is claimed on Japanese Patent Application No. 2008-320771, filed on Dec. 17, 2008, the contents of which are incorporated herein by reference.

FIELD OF THE INVENTION

The present invention relates to a fuel cell system and a method of starting the fuel cell system.

DESCRIPTION OF THE RELATED ART

A fuel cell has been developed, in which a solid polymer electrolyte membrane is interposed to form a cathode passage and an anode passage, and cathode gas is supplied to the cathode passage, while anode gas is supplied to the anode passage, thereby generating electric power. A fuel cell system having such a kind of fuel cell includes a cathode supply passage for supplying the cathode gas to the cathode passage, a cathode discharging passage for discharging cathode discharged gas from the cathode passage, an anode supply passage for supplying the anode gas to the anode passage, and an anode discharging passage for discharging anode discharged gas from the anode passage. Also, a diluting system for diluting the anode gas with the cathode gas is installed at a downstream side of the cathode discharging passage and the anode discharging passage.

Also, the fuel cell system further includes a shutoff valve disposed in the anode supply passage and a purge valve disposed in the anode discharging passage. At the time of stoppage of the electric power generation of the fuel cell, sealing of the anode passage is performed by closing the shutoff valve and the purge valve. In this instance, while a finite quantity of the anode gas is sealed off in the anode passage, an infinite quantity of the cathode gas exists in the cathode passage. As a result, there is concern that unexpected reaction may occur to deteriorate the solid polymer electrolyte membrane. Accordingly, a technique for performing the sealing of the cathode passage by installing a sealing valve in the cathode gas supply passage and the cathode discharging passage, respectively, and closing the pair of sealing valves at the time of stoppage of the electric power generation of the fuel cell has been proposed (e.g., see Japanese Unexamined Patent Application, First Publication No. 2005-93115).

Meanwhile, at the time of start-up of the fuel cell system, the pair of sealing valves is opened to release the sealing of the cathode passage, thereby performing cathode recovery process which supplies the cathode gas to the cathode passage.

Further, at the time of start-up of the fuel cell system, OCV (Open Circuit Voltage) purge process (hereinafter referred to as a purge process) is performed. This process firstly releases the sealing of the anode passage by the shutoff valve. Next, the anode gas is supplied to the anode passage to increase the pressure of the anode passage. Then, the sealing of the anode passage by the purge valve is released to allow the anode gas to be discharged. The purge process is carried out so that impure gas remaining in the anode passage may be discharged to replenish the anode passage with the high-concentration anode gas.

If the purge is performed, the anode gas filled in the anode passage is discharged, and then is supplied to the diluting system.

During the stoppage of the electric power generation of the fuel cell, however, the anode gas sealed off in the anode passage permeates the solid polymer electrolyte membrane and thus leaks to the cathode passage. As a result, the anode gas exists also in the cathode passage at the time of start-up of the fuel cell system. If the cathode recovery process is performed in this state, the anode gas existing in the cathode passage is discharged, and then is supplied to the diluting system. Consequently, there is a problem in that if the purge process and the cathode recovery process are simultaneously performed, a lot of anode gas is supplied to the diluting system, and thus the diluting system overflows, so that the diluting is not sufficiently carried out.

SUMMARY OF THE INVENTION

Therefore, an object of the invention is to provide a fuel cell system and a method of starting the fuel cell system, which can prevent overflow of a discharged gas processing unit at the time of start-up of the fuel cell system.

(1) A fuel cell system according to the invention includes a fuel cell having a solid polymer electrolyte membrane, and a cathode passage and an anode passage, with the solid polymer electrolyte membrane being interposed between the cathode passage and the anode passage, the fuel cell supplying cathode gas to the cathode passage and supplying anode gas to the anode passage to generate electric power; a cathode supply passage through which the cathode gas is supplied to the cathode passage; a cathode discharging passage through which cathode discharged gas is discharged from the cathode passage; an anode supply passage through which the anode gas is supplied to the anode passage; an anode discharging passage through which anode discharged gas is discharged from the anode passage; a pair of cathode shutoff units each installed in the cathode supply passage and the cathode discharging passage; an anode shutoff unit installed in the anode supply passage; an anode discharging unit installed in the anode discharging passage; a discharged gas processing unit installed in a downstream side rather than the cathode shutoff unit of the cathode discharging passage and the anode discharging unit of the anode discharging passage; and a control unit for performing sealing of the cathode passage by the pair of cathode shutoff units and simultaneously performing sealing of the anode passage by the anode shutoff unit and the anode discharging unit, at the time of stoppage of electric power generation of the fuel cell, wherein the control unit releases the sealing of the cathode passage by the pair of cathode shutoff units, at the time of start-up of the fuel cell system, and then releases the sealing of the anode passage by the anode discharging unit, thereby performing a purge process to allow discharge of the anode gas.

With the fuel cell system according to (1) above, the sealing of the cathode passage is released, and the anode gas in the cathode passage is supplied to and processed in the discharged gas processing unit. And then, the sealing of the anode passage is released, and then the anode gas in the anode passage is supplied to and processed in the discharged gas processing unit. As a result, it is possible to process the anode gas in the discharged gas processing unit little by little, thereby preventing overflow of the anode gas in the discharged gas processing unit.

(2) The fuel cell system according to (1) above may further include anode gas-quantity acquiring unit for acquiring a quantity of the anode gas existing in the cathode passage, wherein the control unit calculates a time until the purge process is allowed after the sealing of the cathode passage by the pair of cathode shutoff units is released, based on the quantity of the anode gas acquired by the anode gas-quantity acquiring unit.

With the fuel cell system according to (2) above, after the quantity of the anode gas in the cathode passage is decreased, the purge process can be performed. As a result, it is possible to prevent the situation in which the purge process is performed while the discharge of the anode gas in the cathode passage continues, thereby preventing the overflow of the anode gas in the discharged gas processing unit. Also, it is possible to prevent the situation in which the purge process is not performed although the discharge of the anode gas in the cathode passage is completed, thereby quickly starting the fuel cell system.

(3) In the fuel cell system according to (2) above, the anode gas-quantity acquiring unit may estimate that as a soak time from the stoppage of the electric power generation of the fuel cell to restart of the fuel cell system is prolonged, the quantity of the anode gas existing in the cathode passage is large.

With the fuel cell system according to (3) above, as a soak time is prolonged, the quantity of the anode gas permeating the solid polymer electrolyte membrane from the anode passage and leaking to the cathode passage is increased, so that the quantity of the anode gas existing in the cathode passage can be accurately seized.

(4) In the fuel cell system according to (2) above, the anode gas-quantity acquiring unit may be an anode gas sensor installed in the cathode passage.

With the fuel cell system according to (4) above, since the detection is performed by the anode gas sensor, the quantity of the anode gas existing in the cathode passage can be accurately seized.

(5) In the fuel cell system according to any one of (1) to (4) above, at the time of restart of the fuel cell system, the control unit may (i) release the sealing of the cathode passage by the pair of cathode shutoff units to start to supply the cathode gas to the cathode passage, simultaneously, (ii) release the sealing of the anode passage by the anode shutoff unit to start to supply the anode gas to the anode passage, and (iii) in the case in which electric power generating voltage displaying performance of the fuel cell generating the electric power is equal to or more than a predetermined voltage, allow an electric current to be extracted from the fuel cell.

With the fuel cell system according to (5) above, before the purge process is completed, the electric power generated by the fuel cell can be used without waste.

(6) In the fuel cell system according to (5) above, the control unit may restrict extraction of an electric current from the fuel cell, before the electric power generating voltage of the fuel cell is equal to or more than the predetermined voltage.

With the fuel cell system according to (6) above, it is possible to prevent deterioration of the solid polymer electrolyte membrane by generating the electric power before the purge process is completed.

(7) In a method of starting a fuel cell system according to the invention, the fuel cell system including a fuel cell having a solid polymer electrolyte membrane, and a cathode passage and an anode passage, with the solid polymer electrolyte membrane being interposed between the cathode passage and the anode passage, the fuel cell supplying cathode gas to the cathode passage and supplying anode gas to the anode passage to generate electric power; a cathode supply passage through which the cathode gas is supplied to the cathode passage; a cathode discharging passage through which cathode discharged gas is discharged from the cathode passage; an anode supply passage through which the anode gas is supplied to the anode passage; an anode discharging passage through which anode discharged gas is discharged from the anode passage; a pair of cathode shutoff units each installed in the cathode supply passage and the cathode discharging passage; an anode shutoff unit installed in the anode supply passage; an anode discharging unit installed in the anode discharging passage; a discharged gas processing unit installed in a downstream side rather than the cathode shutoff unit of the cathode discharging passage and the anode discharging unit of the anode discharging passage; and a control unit for performing sealing of the cathode passage by the pair of cathode shutoff units and simultaneously performing sealing of the anode passage by the anode shutoff unit and the anode discharging unit, at the time of stoppage of electric power generation of the fuel cell, the control unit releases the sealing of the cathode passage by the pair of cathode shutoff units, at the time of start-up of the fuel cell system, and then releases the sealing of the anode passage by the anode discharging unit, thereby performing a purge process to allow discharge of the anode gas.

With the method of starting the fuel cell system according to (7) above, the sealing of the cathode passage is released, and the anode gas in the cathode passage is supplied to and processed in the discharged gas processing unit. And then, the sealing of the anode passage is released, and then the anode gas in the anode passage is supplied to and processed in the discharged gas processing unit. As a result, it is possible to process the anode gas in the discharged gas processing unit little by little, thereby preventing the overflow of the anode gas in the discharged gas processing unit.

BRIEF DESCRIPTION OF THE DRAWINGS

FIG. 5 is a timing chart depicting a method of starting a fuel cell system according to an embodiment of the invention.

DETAILED DESCRIPTION OF THE INVENTION

Embodiments of the invention will now be described with reference to the accompanying drawings. In this embodiment, a fuel cell system equipped in an electrical vehicle is described as an example.

(Fuel Cell System)

Figure 1:
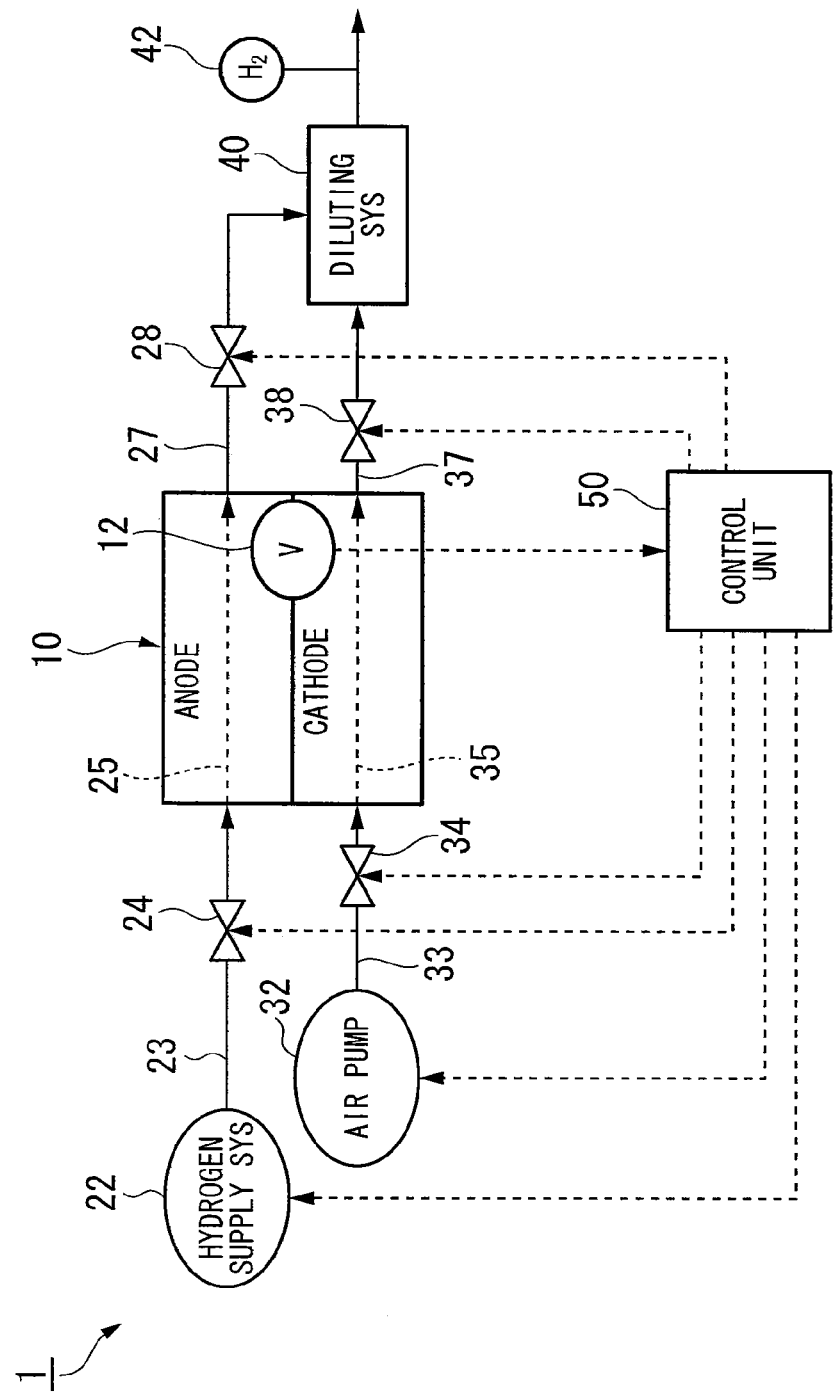
FIG. 1 is a block diagram schematically showing the configuration of a fuel cell system according to an embodiment of the invention.

FIG. 1 is a block diagram schematically showing the configuration of a fuel cell system 1 according to an embodiment of the invention.

The fuel cell system 1 includes a fuel cell 10 for generating electric power by supplying cathode gas and anode gas. The fuel cell 10 has a plurality of unit fuel cells (hereinafter referred to as "a unit cell") which are stacked and electrically connected in series to each other. The unit cell is formed by disposing separators at both sides of a membrane electrode structure. The member electrode structure is constituted by an anode electrode and a cathode electrode which are disposed at both sides of a solid polymer electrolyte membrane (electrolyte membrane) made of, for example, a fluorine-based electrolyte material. The anode-side separator is disposed with facing to the anode electrode of the membrane electrode structure, and an anode passage 25 is formed between the anode-side separator and the anode electrode. Also, a cathode-side separator is disposed with facing to the cathode electrode of the membrane electrode structure, and a cathode passage 35 is formed between the cathode-side separator and the cathode electrode.

In the fuel cell 10, the anode passage 25 is supplied with fuel gas, such as hydrogen gas, as the anode gas, and the cathode passage 35 is supplied with an oxidizer gas, such as air containing oxygen, as the cathode gas. As a result, hydrogen ion generated from the anode electrode by catalytic reaction transfers to the cathode electrode through the solid polymer electrolyte membrane. The hydrogen ion causes an electrochemical reaction with oxygen at the cathode electrode to generate the electric power. In addition, the fuel cell 10 is provided with a voltmeter 12.

An inlet side of the anode passage 25 is connected to a hydrogen supply system 22 and an anode supply passage 23 for supplying the anode gas to the anode passage 25. The anode supply passage 23 is provided with a shutoff valve (anode shutoff unit) for blocking the supply of the anode gas.

Further, an outlet side of the anode passage 25 is connected to an anode discharging passage 27 for discharging anode discharged gas from the anode passage 25. The anode discharging passage 27 is provided with a purge valve (anode discharging unit) for purging inner gas of the anode passage 25.

Meanwhile, the inlet side of the cathode passage 35 is connected to an air pump 32 and a cathode supply passage 33 for supplying the cathode gas to the cathode passage 35. The cathode supply passage 33 is provided with an inlet-side sealing valve (cathode shutoff unit) for sealing the inlet side of the cathode passage 35.

Also, the outlet side of the cathode passage 35 is connected to the cathode discharging passage 37 for discharging cathode discharged gas from the cathode passage 35. The cathode discharging passage 37 is provided with an outlet-side sealing valve (cathode shutoff unit) for sealing the outlet side of the cathode passage 35.

The anode discharging passage 27 and the cathode discharging passage 37 are provided with a diluting system (discharged gas processing unit) 40 at the downstream side thereof. The diluting system 40 dilutes the fuel gas with the oxidizer gas, and discharges the gas to the outside of the fuel cell system 1. In this instance, a catalytic combustor may be installed in place of the diluting system 40.

The diluting system 40 is provided with a hydrogen sensor 42 for detecting concentration of exhausted hydrogen at the downstream side thereof.

The fuel cell system 1 includes a control unit 50. The control unit controls the opening and closing operation of the pair of sealing valves 34 and 38, the shutoff valve 24, and the purge valve 28. Also, the control unit 50 monitors the voltmeter 12 to control the operation of the hydrogen supply system 22 and the air pump 32.

At the time of stoppage of the electric power generation of the fuel cell 10, the control unit 50 closes the shutoff valve 24 and the purge valve 28 to perform the anode sealing process which seals the anode passage 25, and simultaneously, closes the pair of sealing valves 34 and 38 to perform the cathode sealing process which seals the cathode passage 35. It is possible to prevent the unreacted anode gas from flowing outwardly via the anode supply passage 23 or the anode discharging passage 27 by performing the anode sealing process. In this instance, if a finite quantity of the anode gas is filled in the anode passage 25, while an infinite quantity of the cathode gas exists in the cathode passage 35, there is concern in that unexpected reaction may occur to deteriorate the solid polymer electrolyte membrane.

Accordingly, it is possible to seal the finite quantity of the cathode gas in the cathode passage 35 by performing the cathode sealing process, thereby preventing deterioration of the solid polymer electrolyte membrane.

During the stop of the fuel cell 10, however, the anode gas sealed off in the anode passage 25 permeates the solid polymer electrolyte membrane and thus leaks to the cathode passage 35. In this embodiment, it is possible to prevent the anode gas leaking to the cathode passage 35 from flowing outwardly via the cathode supply passage 33 or the cathode discharging passage 37 by performing the cathode sealing process. However, at the time of restart of the fuel cell, the anode gas exists in the cathode passage 35. Consequently, at the time of start-up of the fuel cell system 1, the control unit 50 opens the pair of sealing valves 34 and 38 to release the sealing of the cathode passage 35, and then performs the cathode recovery process which supplies the cathode gas to the cathode passage 35. The anode gas existing in the cathode passage 35 is discharged by the cathode recovery process, and then is supplied to the diluting system 40. In this instance, in the case in which a lot of the anode gas exists in the cathode passage 35, the pair of sealing valves 34 and 38 is intermittently opened to discharge the anode gas to the diluting system 40 little by little.

Also, the control unit 50 performs an OCV purge process (hereinafter referred to as a purge process) at the time of start-up of the fuel cell system 1. This process releases the sealing of the anode passage 25 by the shutoff valve 24. Next, the anode passage 25 is supplied with the anode gas to increase the pressure of the anode passage 25. And then, the sealing of the anode passage 25 by the purge valve 28 is released to allow the anode gas to be discharged. The impurity gas remaining in the anode passage 25 is discharged by performing the purge process to replenish the anode passage 25 with the high-concentration anode gas. The anode gas existing in the anode passage 25 is discharged by the purge process, and then is supplied to the diluting system 40. In this instance, in the case in which a lot of anode gas exists in the anode passage 25, the purge valve 28 is intermittently opened to discharge the anode gas to the diluting system 40 little by little.

However, there is concern in that if the cathode recovery process and the purge process are simultaneously performed, a lot of anode gas is supplied to the diluting system 40, and thus the diluting system 40 overflows, so that the diluting is not sufficiently carried out.

Consequently, the control unit 50 performs the purge process after the cathode recovery process is performed. As a result, it is possible to prevent the overflow of the diluting system 40.

The time (purge allowing time) from the beginning of the cathode recovery process to the allowing of the purge process is varied depending upon a quantity of the anode gas existing in the cathode passage 35. Consequently, the control unit 50 is provided with an anode gas-quantity acquiring unit (not shown). In this instance, the quantity of the anode gas leaking from the anode passage 25 to the cathode passage 35 is varied by a soak time until ignition of the electrical vehicle is switched from OFF to ON. As a result, the anode gas-quantity acquiring unit estimates the quantity of the anode gas based on the soak time. In this instance, the quantity of the anode gas may be directly detected by the anode gas sensor disposed in the cathode passage 35.

The control unit 50 calculates the purge allowing time based on the quantity of the anode gas acquired by the anode gas-quantity acquiring unit.

(Method of Starting Fuel Cell System)

A method of starting the fuel cell system 1 according to the embodiment will now be described in detail.

Figure 2:
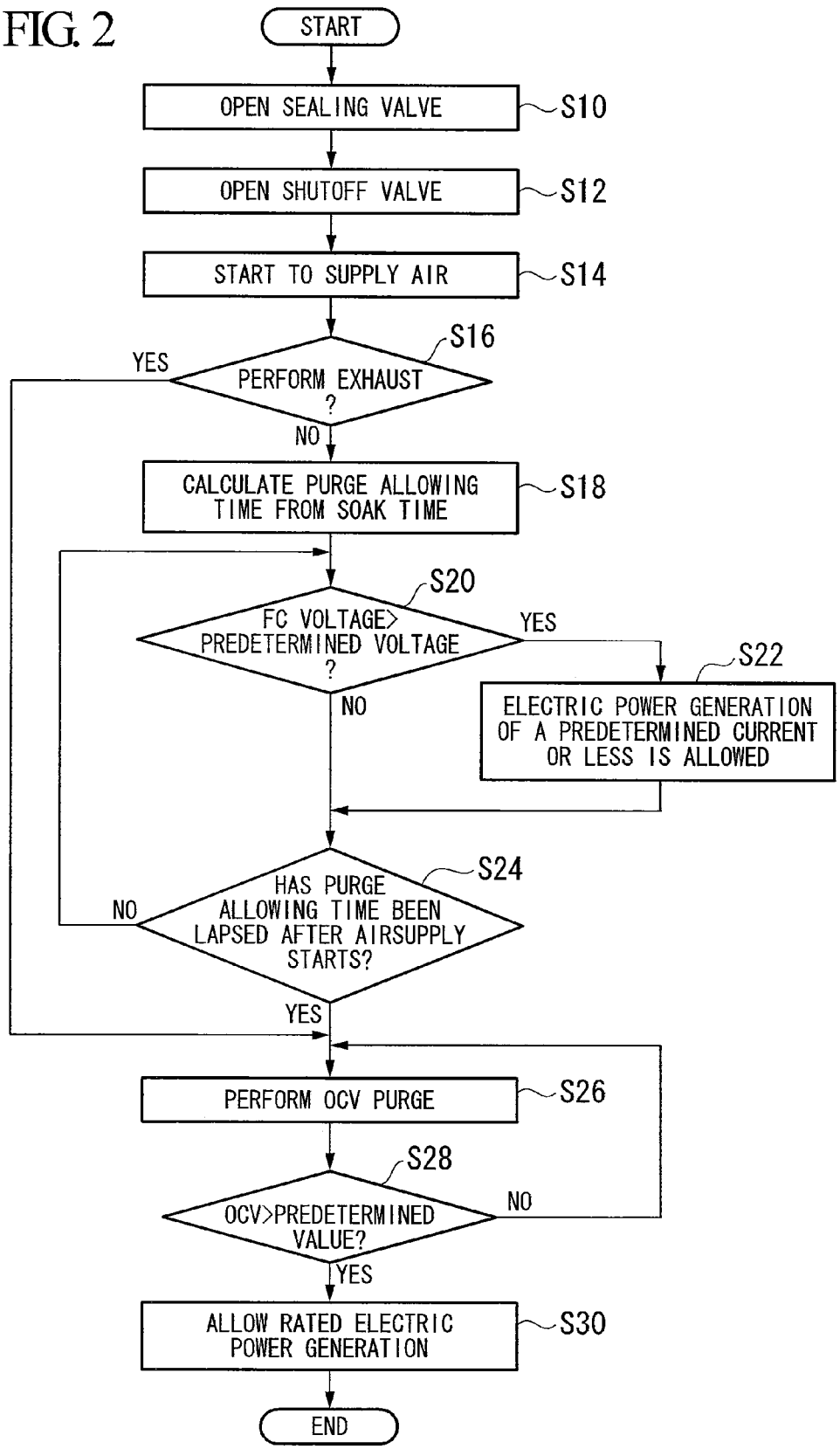
FIG. 2 is a flowchart showing a method of starting a fuel cell system according to an embodiment of the invention.

FIG. 2 is a flowchart showing the method of starting the fuel cell system 1 according to an embodiment of the invention, and FIG. 5 is a timing chart.

First, at step S10 (t1 of FIG. 5), the pair of sealing valves 34 and 38 are opened.

Also, at step S12 (t1 of FIG. 5), the shutoff valve 24 is opened to supply the anode gas from the hydrogen supply system 22 to the anode passage 25, thereby increasing the pressure of the anode passage 25.

Next, as step S14 (t2 of FIG. 5), the air pump 32 is operated to start to supply the cathode gas to the cathode passage 35 (cathode recovery process). Also, in the case in which the anode supply passage 23 is provided with a regulator rendering the pressure of the cathode supply passage 33 as signal pressure, the anode passage 25 is supplied with the anode gas at this time.

If the cathode passage 35 is supplied with the cathode gas, the anode gas existing in the cathode passage 35 is discharged, and then is supplied to the diluting system 40. The diluting system 40 dilutes the anode gas with the cathode gas to discharge it outwardly. As shown in FIG. 5, the concentration of the hydrogen exhausted from the diluting system 40 is increased from the operation start time t2 of the air pump 32.

In this embodiment, after the cathode recovery process is carried out, the purge process is performed to prevent the overflow of the diluting system 40. The detailed order will now be described in detail hereinafter.

First, at step S16, it is determined whether or not scavenging of the anode passage 25 and the cathode passage 35 is performed while the electric power generation of the fuel cell 10 is stopped. If the scavenging is performed, since the quantity of the anode gas remaining in the anode passage 25 and the cathode passage 35 is small, it is not necessary to take the overflow of the diluting system 40 into consideration. In this instance, it proceeds to step S26 to perform the purge process immediately. If the judgment of step S16 is NO, it proceeds to step S18.

Next, at step S18, the time (purge allowing time) from the beginning of the cathode recovery process to the allowing of the purge process is calculated. The purge allowing time is a time until the discharge of the anode gas existing in the cathode passage 35 is almost completed, and is determined depending upon the quantity of the anode gas in the cathode passage 35. The quantity of the anode gas in the cathode passage is calculated depending upon the soak time until the ignition of the electrical vehicle is switched from OFF to ON.

Figure 3:
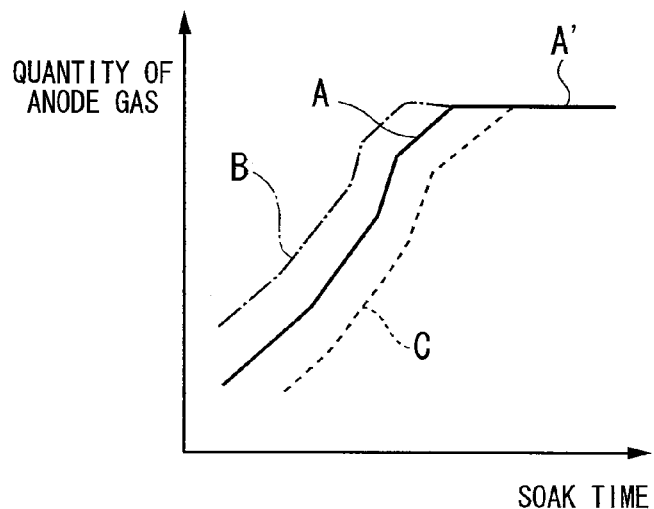
FIG. 3 is a graph depicting a relation between a soak time and a quantity of anode gas existing in a cathode passage.

FIG. 3 is a graph depicting a relation between the soak time and the quantity of the anode gas existing in the cathode passage. As the soak time is prolonged, the quantity of the anode gas permeating the solid polymer electrolyte membrane from the anode passage 25 and leaking to the cathode passage 35 is increased. As a result, in the graph A, as the soak time is prolonged, the quantity of the anode gas is increased. If the soak time is too prolonged, the concentration of the anode gas in both passages 25 and 35 is equalized, and thus the leak of the anode gas is stopped. Consequently, the quantity of the anode gas is constant in the graph A'. Also, if the temperature during the soak is high, the leak of the anode gas is accelerated, so that the quantity of the anode gas in the graph B is larger than that of the anode gas in the graph A. By contrast, if the temperature during the soak is low, the leak of the anode gas is suppressed, so that the quantity of the anode gas in the graph C is smaller than that of the anode gas in the graph A.

The anode gas-quantity acquiring unit estimates the quantity of the anode gas in the cathode passage 35 based on the soak time by using the respective graphs of FIG. 3 as a map.

Figure 4:
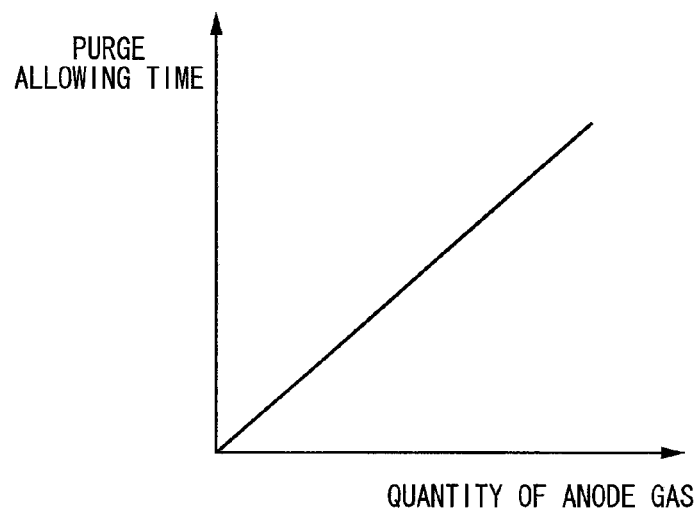
FIG. 4 is a graph depicting a relation between a quantity of anode gas in a cathode passage and a purge allowing time.

FIG. 4 is a graph depicting a relation between the quantity of the anode gas in the cathode passage and the purge allowing time. If the quantity of the anode gas in the cathode passage is large, since it is necessary to supply the anode gas to the diluting system 40 little by little by intermittently opening the pair of sealing valves 34 and 38, the time needed for the cathode recovery process is prolonged. Consequently, the purge allowing time is extended in proportion to the quantity of the anode gas.

The control unit 50 calculates the purge allowing time based on the quantity of the anode gas acquired by the anode gas-quantity acquiring unit and the graph of FIG. 4. That is, as the soak time is prolonged, the purge allowing time is set to be long.

However, since the cathode gas flows in the cathode passage 35 by the start of the operation of the air pump 32, and the anode gas exists in the anode passage 25 by the opening of the shutoff valve 24, the voltage of the fuel cell 10 is increased from the operation start time t2 of the air pump 32 in FIG. 5. That is, the fuel cell 10 is in the state of generating the electric power, although it is limited.

Accordingly, at step S20, it is determined whether or not the voltage of the fuel cell 10 is more than a predetermined voltage. The predetermined voltage is set as a voltage to drive the vehicle at a slow speed, a voltage to operate an air conditioner or the like. If the judgment at step S20 is YES, the electric power generation is allowed at step S22 (t3 of FIG. 5). Consequently, it is possible to use the electric power generated by the fuel cell 10 without waste.

Since the purge valve 28 is closed at this time, the anode gas does not flow in the anode passage 25. As a result, if the fuel cell 10 is allowed to generate a rated electric power at this time, there is concern in that the solid polymer electrolyte membrane may be deteriorated. Therefore, until the purge process is completed (between t3 and t5 in FIG. 5), extraction of the electric current from the fuel cell 10 is restricted to a predetermined current and less. Consequently, it is possible to prevent deterioration of the solid polymer electrolyte membrane.

Next, at step S24, it is determined whether or not the purge allowing time has been lapsed after the cathode recovery process starts. If the judgment at step S24 is NO, the cathode recovery process is continuously performed. If the judgment is YES, it proceeds to step S26.

And then, at step S26 (t4 of FIG. 5), the purge valve 28 is opened to start the purge process. In this instance, in the case in which the upper limit of the purge allowing time is set and then the time after the cathode recovery process starts reaches the upper limit, the purge process may automatically start.

In FIG. 5, a period from t2 to t4 corresponds to the purge allowing time. The concentration of the hydrogen exhausted from the diluting system 40 starts to increase from the start time t2 of the cathode recovery process, and then reaches the peak. As the cathode recovery process comes close to the completion, the concentration decreases. Next, the concentration starts to increase again from the start time t4 of the purge process.

Next, at step S28, it is determined whether or not the voltage of the fuel cell 10 is more than a predetermined value (predetermined voltage). If the judgment at step S28 is NO, the purge process is repeated. That is, the purge valve 28 is again closed to increase the pressure of the anode passage 25, and then the purge valve 28 is opened to discharge the anode gas. If the judgment at step S28 is YES, it proceeds to step S30.

And then, at step S30 (t5 of FIG. 5), the fuel cell 10 is allowed to generate the rated electric power. In this instance, in the case in which the upper limit of the times of the purge processes has been set and then the times of the purge processes reaches the upper limit, the generation of the rated electric power may be automatically allowed irrespective of the voltage of the fuel cell 10.

The start-up of the fuel cell system 1 is completed by the above.

As concretely described above, the fuel cell system 1 according to the embodiment is adapted to perform the purge process in which at the time of start-up of the fuel cell system, after the sealing of the cathode passage 35 by the pair of sealing valves 34 and 38 is released, the sealing of the anode passage 25 by the purge valve 28 is released to allow the anode gas to be discharged.

With the above configuration, the sealing of the cathode passage 35 is released, and the anode gas in the cathode passage 35 is supplied to and processed in the diluting system 40. And then, the sealing of the anode passage 25 is released, and then the anode gas in the anode passage 25 is supplied to and processed in the diluting system 40. As a result, it is possible to process the anode gas in the diluting system 40 little by little, thereby preventing the overflow of the diluting system 40.

Further, the fuel cell system 1 according to the embodiment includes the anode gas-quantity acquiring unit for acquiring the quantity of the anode gas existing in the cathode passage 35, and is adapted to calculate the purge allowing time until the purge process is allowed after the sealing of the cathode passage 35 by the pair of sealing valves 34 and 38 is released, based on the quantity of the anode gas acquired by the anode gas-quantity acquiring unit.

With the configuration, after the quantity of the anode gas in the cathode passage 35 is decreased, the purge process can be performed. As a result, it is possible to prevent the situation in which the purge process is performed while the discharge of the anode gas in the cathode passage 35 continues, thereby preventing the overflow of the diluting system 40. Also, it is possible to prevent the situation in which the purge process is not performed although the discharge of the anode gas in the cathode passage 35 is completed, thereby quickly starting the fuel cell system 1.

While preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the embodiment is explained by taking an example of the fuel cell system equipped in the electric vehicle, the fuel cell system of the invention may be applied to others besides the electric vehicle.

Also, the fuel cell system shown in FIG. 1 is an example, and may employ other configuration.

What is claimed is:

1. A fuel cell system comprising:
   a fuel cell including a solid polymer electrolyte membrane, and a cathode passage and an anode passage, with the solid polymer electrolyte membrane being interposed between the cathode passage and the anode passage, the fuel cell supplying cathode gas to the cathode passage and supplying anode gas to the anode passage to generate electric power;
   a cathode supply passage through which the cathode gas is supplied to the cathode passage;
   a cathode discharging passage through which cathode discharged gas is discharged from the cathode passage;
   an anode supply passage through which the anode gas is supplied to the anode passage;
   an anode discharging passage through which anode discharged gas is discharged from the anode passage;
   a pair of cathode shutoff units each installed in the cathode supply passage and the cathode discharging passage;
   an anode shutoff unit installed in the anode supply passage;
   an anode discharging unit installed in the anode discharging passage;
   a discharged gas processing unit installed in a downstream side of both the cathode shutoff unit of the cathode discharging passage and the anode discharging unit of the anode discharging passage, the discharged gas processing unit configured to process the anode gas and the cathode gas and discharge the processed anode gas and the processed cathode gas outside of the fuel system; and
   a control unit configured to seal the cathode passage by the pair of cathode shutoff units and simultaneously seal the anode passage by the anode shutoff unit and the anode discharging unit, at the time of stoppage of electric power generation of the fuel cell,
   wherein the control unit releases the sealing of the cathode passage by the pair of cathode shutoff units, at the time of start-up of the fuel cell system, and then releases the sealing of the anode passage by the anode discharging unit, thereby performing a purge process to allow discharge of the anode gas.

2. The fuel cell system according to claim 1, further comprising:
   anode gas-quantity acquiring unit for acquiring a quantity of the anode gas existing in the cathode passage,
   wherein the control unit calculates a time until the purge process is allowed after the sealing of the cathode passage by the pair of cathode shutoff units is released, based on the quantity of the anode gas acquired by the anode gas-quantity acquiring unit.

3. The fuel cell system according to claim 2, wherein the anode gas-quantity acquiring unit detects that as a soak time from the stoppage of the electric power generation of the fuel cell to restart of the fuel cell system is prolonged, the quantity of the anode gas existing in the cathode passage is large.

4. The fuel cell system according to claim 2, wherein the anode gas-quantity acquiring unit is an anode gas sensor installed in the cathode passage.

5. The fuel cell system according to claim 1, wherein at the time of restart of the fuel cell system, the control unit (i) releases the sealing of the cathode passage by the pair of cathode shutoff units to start to supply the cathode gas to the cathode passage, simultaneously, (ii) releases the sealing of the anode passage by the anode shutoff unit to start to supply the anode gas to the anode passage, and (iii) in the case in which electric power generating voltage displaying performance of the fuel cell generating the electric power is equal to or more than a predetermined voltage, allows an electric current to be extracted from the fuel cell.

6. The fuel cell system according to claim 5, wherein the control unit restricts extraction of an electric current from the fuel cell, before the electric power generating voltage of the fuel cell is equal to or more than the predetermined voltage.

7. A method of starting a fuel cell system including:

a fuel cell including a solid polymer electrolyte membrane, and a cathode passage and an anode passage, with the solid polymer electrolyte membrane being interposed between the cathode passage and the anode passage, the fuel cell supplying cathode gas to the cathode passage and supplying anode gas to the anode passage to generate electric power;

a cathode supply passage through which the cathode gas is supplied to the cathode passage;

a cathode discharging passage through which cathode discharged gas is discharged from the cathode passage;

an anode supply passage through which the anode gas is supplied to the anode passage;

an anode discharging passage through which anode discharged gas is discharged from the anode passage;

a pair of cathode shutoff units each installed in the cathode supply passage and the cathode discharging passage;

an anode shutoff unit installed in the anode supply passage;

an anode discharging unit installed in the anode discharging passage;

a discharged gas processing unit installed in a downstream side of both the cathode shutoff unit of the cathode discharging passage and the anode discharging unit of the anode discharging passage, the discharged gas processing unit configured to process the anode gas and the cathode gas and discharge the processed anode gas and the processed cathode gas outside of the fuel system; and a control unit configured to seal the cathode passage by the pair of cathode shutoff units and simultaneously seal the anode passage by the anode shutoff unit and the anode discharging unit, at the time of stoppage of electric power generation of the fuel cell, wherein the control unit releases the sealing of the cathode passage by the pair of cathode shutoff units, at the time of start-up of the fuel cell system, and releases the sealing of the anode passage by the anode discharging unit, thereby performing a purge process to allow discharge of the anode gas.

8. The fuel cell system according to claim 1, wherein the discharged gas processing unit is a diluting system configured to dilute a fuel gas with an oxidizer gas.

9. A method of starting a fuel cell system according to claim 7, wherein the discharged gas processing unit is a diluting system configured to dilute a fuel gas with an oxidizer gas.

* * * * *